J. L. YEOMAN.
UNIVERSAL JOINT AND FOUR WHEEL DRIVE.
APPLICATION FILED DEC. 5, 1911.
1,038,706.
Patented Sept. 17, 1912.
2 SHEETS—SHEET 2.
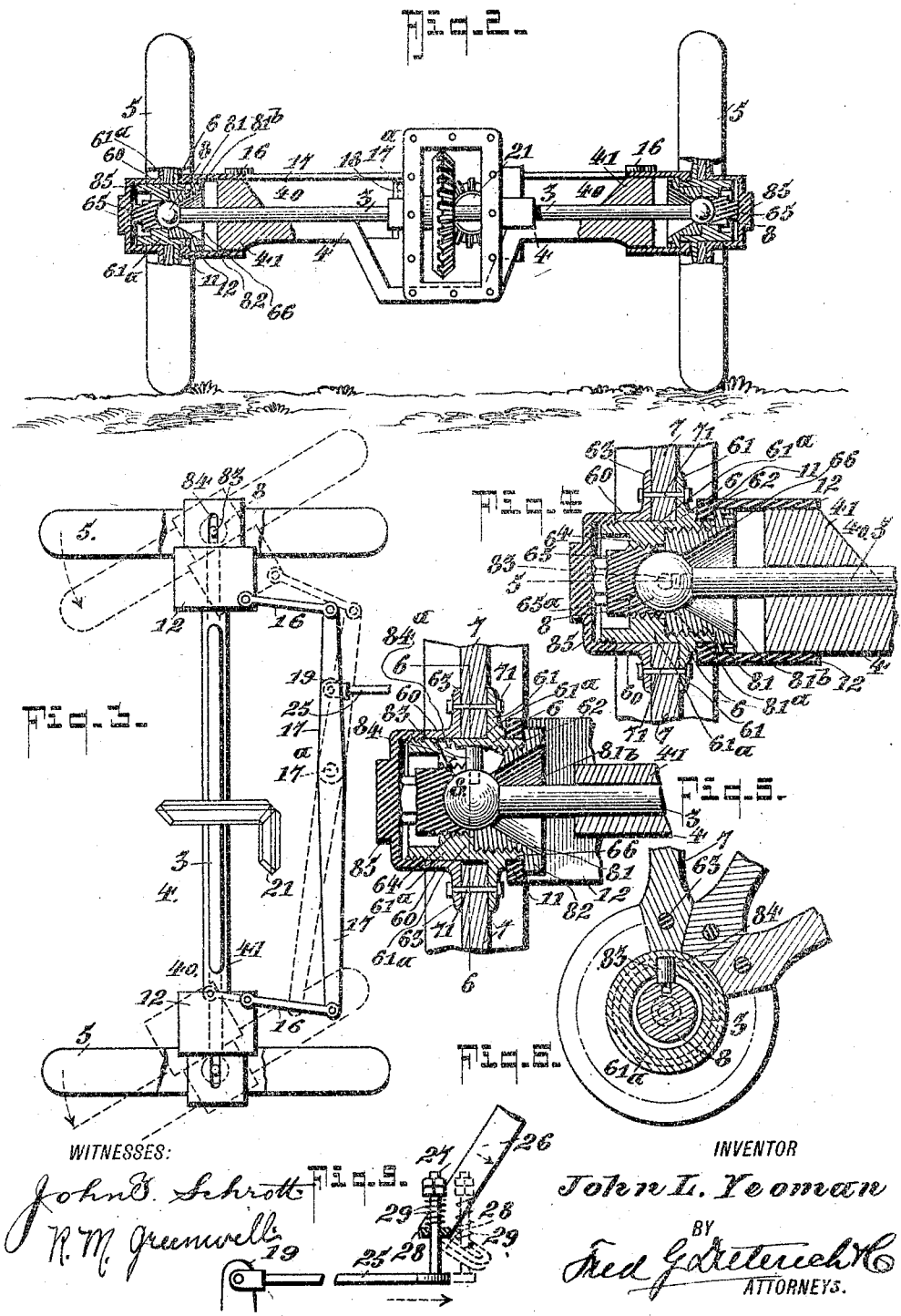
INVENTOR
John L. Yeoman
BY
Fred G. Dieterich
ATTORNEYS.
WITNESSES:
John D. Schrott
R. M. Grinnell

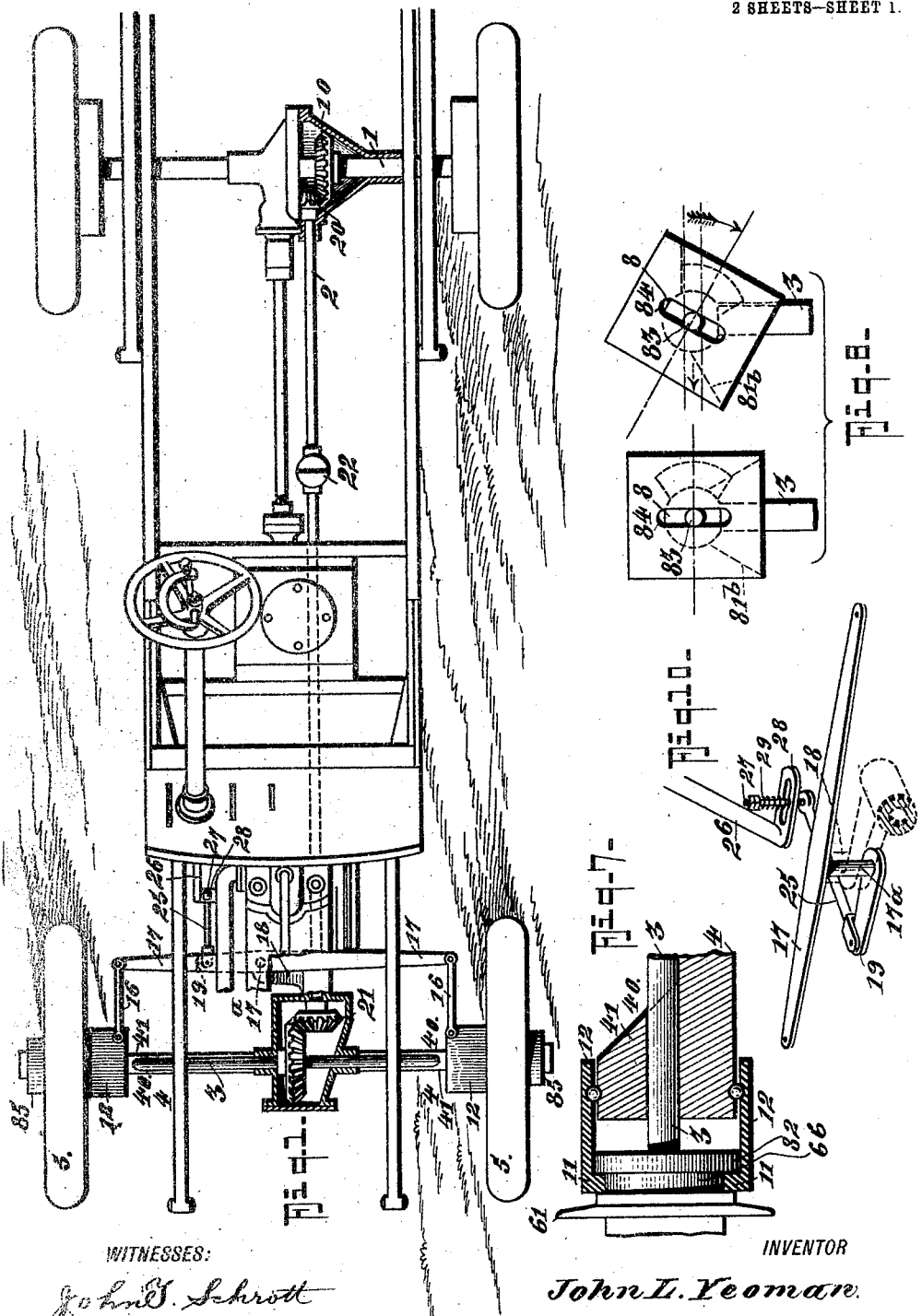

UNITED STATES PATENT OFFICE.

JOHN L. YEOMAN, OF CHEHALIS, WASHINGTON.

UNIVERSAL JOINT AND FOUR-WHEEL DRIVE.

1,038,706.

Specification of Letters Patent. Patented Sept. 17, 1912.

Application filed December 5, 1911. Serial No. 664,018.

*To all whom it may concern:*

Be it known that I, JOHN L. YEOMAN, residing at Chehalis, in the county of Lewis and State of Washington, have invented a new and Improved Universal Joint and Four-Wheel Drive, of which the following is a specification.

This invention relates to improvements in that class of motor vehicle drive gearing mechanisms in which the steering or front wheels are coupled with the driven shaft to turn in the same direction with the said driven shaft and in such a manner that the steering operation of the front or steering wheels is not only not interfered with but the propulsion and steering functions thereof are greatly facilitated.

My invention has for its purpose to provide a combined propulsion and steering gear mechanism of the general character stated of a simple and economical construction, in which the parts are especially designed for a convenient and quick assemblage and for being readily individually replaced when broken, and in which the action of steering is imparted to the motor driven front wheels by the usual steering wheel adjustments.

With other objects in view that will be hereinafter referred to, be specifically pointed out in the appended claims and illustrated in the accompanying drawings, in which:—

Figure 1, is a top plan view of the chassis of an auto vehicle, and showing my invention as operatively applied, the gear connections being also shown and parts of the driving gear casings being shown in section. Fig. 2, is a front elevation, the gear casing cover being removed and parts of the hub mechanism shown in section. Fig. 3, is a diagrammatic plan view that illustrates more fully the turning means. Fig. 4, is an enlarged vertical section of the improved hub construction. Fig. 5, is a horizontal section of the same on the line 5—5 on Fig. 4. Fig. 6, is a cross section taken on the line 6—6 on Fig. 5. Fig. 7, is a view, partly in elevation and partly in section illustrating a modified construction hereinafter specifically referred to. Fig. 8, is a diagrammatic view that shows the pin and slot connection in the hub and also shows the rela-tive position of the coacting parts when making a turn. Figs. 9 and 10, are a detail elevation, partly sectional of the connection between the steering post and shifting lever and a detail perspective view of the same lever and its coöperating parts, respectively.

In carrying out my invention, I provide a direct gear connection between the rear or motor driven shaft 1, and the front or steering shaft 3, and the said connection is made in the manner best shown in Fig. 1, of the drawings, by reference to which it will be noticed the shaft 1 carries a bevel gear 10 that meshes with a bevel pinion 20 on the longitudinally extended coupling shaft 2, the front end of which carries a bevel pinion 21 that meshes with and imparts motion to the front or steering shaft 3. In practice, the shaft 2 has a universal joint 22 to compensate for the riding motion of the front or steering shaft wheels relatively to the rear shaft and wheels. The steering shaft 3 has long bearings on the oppositely extended portions 40 of the front chassis 4 and the latter have hub-like portions 41 at the opposite ends through which the opposite ends of the shaft 3 pass, as is clearly shown in Figs. 1 and 2.

5—5 designates the front or steering wheels which are mounted on and have a universal coupling connection with the opposite ends of the shaft 3. The universal connections, the construction of which forms an essential feature of my invention, and are best shown by Figs. 2, 3, 4 and 5 of the drawings, each comprise a hub composed of an inner member 6 having an annular flange 61 and an internal thread 62, and an outer member 60 that has an annular flange 63 that opposes the flange 61, and in connection with the said flange 61 and the horizontal extension 61$^a$ thereof form the annular socket for receiving the wheel spokes 7 that are made fast by the bolts 71 that pass through the spokes and the opposite flanges 61 and 63 and secured in any approved manner. The inner member 6 is also provided with an internally threaded portion 64, of smaller diameter than the threaded portion 62, for receiving the nut bearing 65, threaded to screw into the said portion 64 and provided with a concaved seat 65$^a$ for engaging the ball 8, secured upon the end of the front shaft 3. A second bearing member 81 coöperates with the member 65 and it has a concaved seat 81ª for engaging the ball 8, as is clearly shown in Figs. 4 and 5, by reference to which it will be also noticed the member 81 has a threaded hub for screwing into the hub member 6 and to allow for the required lateral or steering movement of the wheel relatively to the shaft 3, (see dotted lines, Fig. 3) the member 81 has a flared opening 81ᵇ.

For locking the wheel to the shaft 3 to cause it to turn with the shaft the ball 8 has a radial lug 83 that projects into a segmental slot 84 formed partly in the member 81 and in the hub portion 61ª and for freely lubricating the parts the slot 84 has a feed opening 84ª that is normally closed by a cap nut 85 that screws onto the hub member 61 and in addition to its acting as a closure for the feed to the universal joint parts it holds the nut bearing 61 for the ball from unscrewing.

In my construction of universal joint, means is also included for holding the front wheels in horizontal alinement with the front axle or shaft, or in other words for holding the wheels from sagging or moving vertically with respect to the shaft 3, and for such purpose each front wheel hub structure includes a ring 11 that rides in an annular groove 66 in the inner hub member 6 and is held from pulling out of the said groove by the annular flange 82 on the bearing member 81, the latter serving as a lock washer, it having apertures for receiving a wrench for screwing it home when the parts are assembled for use.

The ring 11 is integral with a pair of flat extensions 12—13 that extend over and ride on the upper and lower faces of the hub-like portions 41 of the front chassis 4, see Fig. 2.

Referring now more particularly to Figs. 1 and 3, it will be noticed that a link 16 is pivotally connected to each of the upper extensions 12 and to the opposite ends of a cross lever 17 which has a stud 17ª centrally mounted in a hub bearing 18, and which carries a crank arm 19 that is integral with or fixedly connected to the stud 17ª. 25 designates a link that connects the crank arm 19 with the steering post 26, and the said connection, by reason of the angle position of the post being arranged as shown in detail, see Fig. 9, which shows a rod 27 projected from the inner end of the link that passes up through a slotted angle extension 28 at the lower end of the steering post, a buffer spring 29 being mounted on the rod 27 for insuring the shifting movement of the link 25 as the post 26 is turned, see dotted lines Fig. 9.

If desired the upper and lower faces of the hubs 41 of the chassis 4 may have roller bearings for the extensions 12 and 13, see Fig. 7.

From the foregoing description, taken in connection with the drawings, the complete construction, the operation and the advantages of my invention will be readily apparent, without requiring a more extended explanation, it being, however, understood that minor details and variations of the parts described may be made without departing from my invention, and as coming within the scope of the appended claims.

What I claim is:

1. In a motor vehicle, wheels universally mounted on the front axle thereof, said axle having ball ends, the hubs of the front wheels each comprising an inner member having two internally threaded portions, a ball engaging plug that threads into one of the internally threaded portions of the inner hub member, a ring loosely mounted on the hub, a cap member threaded into the other threaded portion of the said hub member, said cap having a keeper portion for holding the ring onto the hub, said ring having a flat member that extends over and engages a flat portion of the chassis, and means coöperating with the said member for turning the wheels on their pivots.

2. In a motor vehicle, wheels universally mounted on the front axle, said axle having ball ends, the hubs of the front wheels each comprising an inner member having two internally threaded portions, a ball engaging plug that threads into one of the internally threaded portions of the inner hub member, a ring loosely mounted on the hub, a cap member threaded into the other threaded portion of the said hub member, said cap having a keeper portion for holding the ring onto the hub, said ring having a flat member that extends over and engages a flat portion of the chassis and means coöperating with the said flat member for turning the wheels on their pivots, an outer hub member that opposes the inner hub member, and a cap that threads onto the inner hub member and engages the outer hub member and covers the threaded plug that engages the ball end of the axle.

3. In a motor vehicle, the combination with the front chassis, a front power driven axle rotatable thereon, a ball on the end of the axle having a radial lug, a wheel having a hub consisting of two opposing members each having flanges for engaging the wheel spokes, one of the said members having an annular groove and two internally threaded portions of different diameters, said flange member also having a segmental groove and an aperture that communicates with the said groove, a cap plate adapted to screw onto the outer end of the aforesaid hub member and adapted to clamp the other hub member against the spokes, the said other hub member forming a closure for the aperture in the first named hub member, a plug having a concaved seat for engaging one side of the ball, a cap plate that threads into the threaded hub portion, said hub portion having an annular groove movable in the said groove, said ring having members that extend over the vehicle chassis, a cap member threadable into the first named hub member, said cap member forming a keeper to hold the ring to the hub.

JOHN L. YEOMAN.

Witnesses:
  L. KUEHNER,
  J. B. SULLIVAN.